(12) United States Patent
Nanja

(10) Patent No.: US 7,065,637 B1
(45) Date of Patent: Jun. 20, 2006

(54) SYSTEM FOR CONFIGURATION OF DYNAMIC COMPUTING ENVIRONMENTS USING A VISUAL INTERFACE

(75) Inventor: Sekaran Nanja, San Jose, CA (US)

(73) Assignee: VERITAS Operating Corporating, Mountain View, CA (US)

( * ) Notice: Subject to any disclaimer, the term of this patent is extended or adjusted under 35 U.S.C. 154(b) by 838 days.

(21) Appl. No.: 09/662,990

(22) Filed: Sep. 15, 2000

Related U.S. Application Data

(60) Provisional application No. 60/228,105, filed on Aug. 24, 2000.

(51) Int. Cl.
G06F 15/177 (2006.01)

(52) U.S. Cl. .................... 713/1; 713/2; 718/104

(58) Field of Classification Search .................... 713/1, 713/2, 100; 717/168–178; 705/26, 27; 709/200, 709/203, 204, 226, 201, 202; 345/733, 735, 345/738; 718/100, 104, 105, 106; 715/700, 715/810, 845
See application file for complete search history.

(56) References Cited

U.S. PATENT DOCUMENTS

| | | | | |
|---|---|---|---|---|
| 4,925,311 A | * | 5/1990 | Neches et al. | 709/100 |
| 5,394,522 A | * | 2/1995 | Sanchez-Frank et al. | 345/735 |
| 5,515,524 A | * | 5/1996 | Lynch et al. | 703/13 |
| 5,555,370 A | * | 9/1996 | Li et al. | 345/763 |
| 5,668,995 A | * | 9/1997 | Bhat | 709/104 |
| 5,894,571 A | * | 4/1999 | O'Connor | 713/2 |
| 6,009,507 A | * | 12/1999 | Brooks et al. | 712/28 |
| 6,081,846 A | * | 6/2000 | Hyder et al. | 709/250 |
| 6,182,123 B1 | * | 1/2001 | Filepp et al. | 709/217 |
| 6,230,200 B1 | * | 5/2001 | Forecast et al. | 709/226 |
| 6,259,448 B1 | * | 7/2001 | McNally et al. | 345/733 |
| 6,393,557 B1 | * | 5/2002 | Guthridge et al. | 713/1 |
| 6,543,047 B1 | * | 4/2003 | Vrhel et al. | 717/121 |
| 6,560,606 B1 | * | 5/2003 | Young | 707/100 |
| 6,564,112 B1 | * | 5/2003 | Factor | 700/97 |
| 6,578,141 B1 | * | 6/2003 | Kelley et al. | 713/1 |

FOREIGN PATENT DOCUMENTS

| | | |
|---|---|---|
| EP | 745929 A1 * | 12/1996 |
| EP | 841616 A2 * | 5/1998 |

OTHER PUBLICATIONS

Simon—"Computer System Built to Order"—Nov. 25, 1996—Newsgroups: demon.adverts, midlands.adverts, sanet.adverts, solent.forsale, uk.adverts.computer, unet.adverts, uk.adverts.other, dungeon.forsale.*

Application Developer's Training Course, SNAP 8.0 Training Participant Guide, Module 7, Copyright © 1997, Template Software, Inc., pp. 7–1 through 7–34.

Workflow Template, Developing A WFT Workflow System, Copyright © 1998, Template Software, Inc.

Workflow Template, Using the WFT Development Environment, Copyright © 1998, Template Software, Inc.

Web Component, Using the Web Component, Copyright © 1997, Template Software, Inc.

* cited by examiner

Primary Examiner—Thuan Du
(74) Attorney, Agent, or Firm—Campbell Stephenson Ascolese LLP

(57) ABSTRACT

The present invention discloses a user interface for creating a dynamic computing environment using allocateable resources. The interface enables the fast, efficient selection and configuration of resources for the computing environment. The resources are fully selectable and allocable by a system architect. In a first embodiment, the ability is provided that allows a customer or system architect to design for a system by allocating resources and specifying how the resources are to be used. The system architect may create a computing environment from a remotely accessible user interface such as a web page on the Internet. Thus, the system architect can create, modify and operate the environment from anywhere in the world.

9 Claims, 10 Drawing Sheets

Web Page 4

Web Page 5

SYSTEM FOR CONFIGURATION OF DYNAMIC COMPUTING ENVIRONMENTS USING A VISUAL INTERFACE

CROSS-REFERENCES TO RELATED APPLICATIONS

This application claims priority from Provisional Application, entitled "Dynamic Computing Environment Using Allocateable Resources" Ser. No. 60/228,105 and filed on Aug. 24, 2000. This application is also related patent application Ser. No. 09/663,252, still pending, entitled User Interface for Dynamic Computing Environment Using Allocateable Resources, filed Sep. 15, 2000. Both applications and their disclosures are incorporated herein by reference for all purposes.

BACKGROUND OF THE INVENTION

The present invention relates in general to digital processing, and more specifically to an interactive system for allowing allocation of resources such as digital processors, networks and software to create a software configured, networked arrangement of processors and processes.

Today, computers are increasingly being used in almost every area of commerce, education, entertainment and productivity. With the growing popularity of the Internet, corporate and campus intranets, home networking and other networks, the trend is to use multiple computers, or processing platforms, to perform tasks and provide services. The networked processors approach is in contrast to traditional approaches of running a single application as a stand-alone application on a single computer.

One approach to networked processing is a "client-server" model whereby a server computer on the Internet is used to transfer information to a client computer. Typically, the client computer is located at an end user's location, such as a personal computer in a user's home. This allows large amounts of information to be stored in, and accessed from, the server computer by many client computers. The client computers can access the server computer simultaneously. Another approach allows a user to obtain portions of executable programs from the server to operate an application program in functional "pieces" or components, on the client computer. For example, a user can run a word-processing program in a client-server mode where the server provides only those portions of the word-processing software to the user's computer on an as-needed basis.

Yet another model is the application service provider (ASP) model. This removes the application still further from the end-user and can involve more processors, such as servers. The ASP model allows a primary set to host a client-server application, or to host any type of data-processing resource such as a database, user interface, program component, data object, etc. The application can appear to the client as being hosted by the primary server when it is actually being provided by one or more other servers. The other servers can provide the application, or components, by having the client directly access the other server, or having the client access the other server through the primary server.

Still other models are possible. Any arbitrary arrangement of processors can be used to provide a service or function to an end user, or to another device such as another processor, consumer electronic device, etc. Examples of such systems are groups of computers used to perform a large mathematical task, such as rendering frames of a video sequence or performing a simulation. Systems that use many processors to exchange information, such as email systems, multicasting programs, voice-over-IP communications, etc., can potentially require hundreds, or even thousands or more, networked processors.

Software is necessary to operate each of these models. Each of the systems described above will likely use multiple software processes on each processing platform. Most likely, the software processes are designed by different software manufacturers. Although there are standard specifications to design compatible software, such software is still designed largely independently of other manufacturers' software. For example, a user may be running an operating system and web browser designed by different companies. Additional processes may be concurrently executing on the user's computer.

Thus, many independently designed hardware devices and software processes must be coordinated in order for the overall networked system to operate correctly and efficiently. This complexity is multiplied by the number of users that the system is designed to support. For example, where the system is an Internet system it is common for the user base to be in the hundreds of thousands, or millions. There may be hundreds or thousands (or more) simultaneous users operating client systems that require tens, or even hundreds, of servers for adequate bandwidth. Different servers in the networked system may perform different functions such as web page serving, database maintenance, caching, etc.

This complexity further manifests itself in another aspect. In the past, software applications used to be monolithic. That is, the application was self-contained within a box with no interaction with other applications. However, this paradigm is no longer true. With Internet and e-commerce applications, for example, a client application is configured to talk to a remotely located server application such as eBay.com®, or Amazon.com®, for example. Typically, e-commerce applications define a three-tier architecture which includes: (1) client; (2) server; and (3) database. Within this architecture, the client may be running an Intel® x86 box with a Microsoft Windows NT™ environment, the server may be running a Sun Microsystems® box running a an iPlanet™ application, the database may be Sun Microsystems® box running Oracle®, for example. Therefore, this three-tiered architecture increases the complexity and cost of many software applications.

In one aspect, the complexity of today's computing environments increases computing costs, and extends the time for a new product to reach the market. This also increases the cost of the logistics of running the computing infrastructure for today's organizations: the cost and time involved in procuring, installing, provisioning and maintaining the infrastructure increases non-linearly with the increase in complexity of the infrastructure. Furthermore, the complexity also increases the need for continual evaluation of competing technologies from different vendors to optimize the running expenditure for the infrastructure. On the other hand, there is no easy access in today's market for comprehensive evaluation of an integrated infrastructure without actually building the infrastructure.

Thus, it is desirable to provide a highly available and easily usable system for overcoming the aforementioned problems and which provides advantages over the prior art.

SUMMARY OF THE INVENTION

The present invention discloses a user interface for creating a dynamic computing environment using allocable resources. The interface enables the fast, efficient selection and configuration of processing resources for the computing environment. In a first embodiment, a primary company, Design2Deploy, Inc.® provides the ability for a customer or system architect to design a system by allocating resources and specifying how the resources are to be used. The system architect may create a computing environment from a remotely accessible user interface such as a web page on the Internet. Thus, the system architect can create, modify and operate the environment from anywhere in the world.

One embodiment of the present invention provides a method for allocating computing resources, the method using a computer coupled to a display device and to a user input device. The method includes, displaying a list of computing resources on the display device; accepting signals from the user input device to indicate the configuration of at least a portion of the processing resources; and configuring the selected computing resource.

A further embodiment of the present invention discloses a system for providing configurable resources to achieve a computing environment. The system includes a configurable communication link; a plurality of computing devices coupled to a the communication link; and a plurality of software programs coupled to the computing devices.

A further embodiment of the present invention discloses a method for creating a computing environment by using a computer user interface, the he computer user interface coupled to a display screen and to an input device for generating signals in response to interactions of a user. The method includes, accepting a first signal from the input device which enables the user to select a configuration of a single computing device for use in the computing environment; accepting a second signal from the input device which enables the user to activate a selected device to run in the computing environment; accepting further signals for restarting the device or for shutting the device down. Advantageously, the present invention facilitates the creation of a computing environment on-demand by the customer, and since the computing environment, in turn, can be coupled over networks, including the Internet, this approach eliminates the logistics cost involved in the creation and use of a computing environment.

DETAILED DESCRIPTION OF THE DRAWINGS

Figure 1:
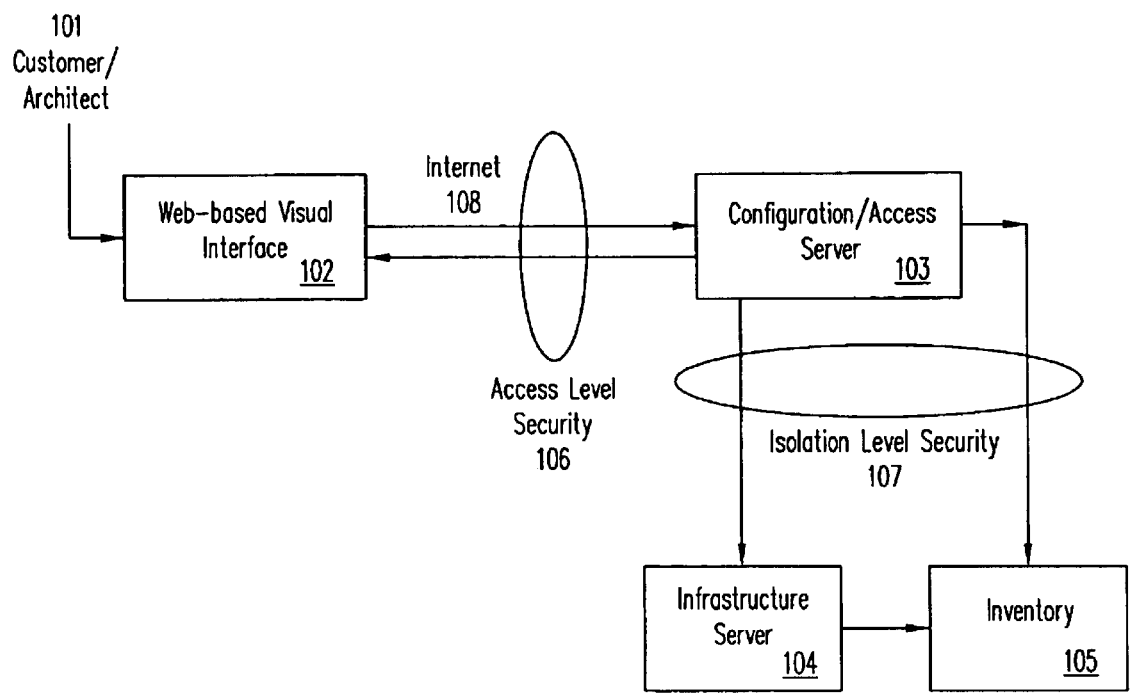
FIG. 1 is a block diagram of a system for configuration of a computing environment and allocation of resources according to the present invention.

Detailed descriptions of the embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention allows fast, efficient selection and configuration of processing networks. The processing network is referred to as a system including "resources." A system resource is any hardware, software or communication components in the system. For example, discrete hardware devices include processing platforms such as computers or processors, mobile/laptop computers, embedded computing devices, hand-held computers, personal digital assistants, point-of-sale terminals, smart-card devices, storage devices, data transmission and routing hardware etc., without limitation. Software, or any other form of instruction, is executed by processors in the system and is a type of resource. Finally, communication resources are also part of the system such as a digital network's hardware, the network configuration and topology, and network control as provided by software or hardware.

The resources are fully selectable and allocable by a system architect. In a preferred embodiment, a primary company, Design2Deploy, Inc.® provides the ability for a system architect to design a system by allocating resources and specifying how the resources are to be used. The system architect can be an individual, corporate entity, etc. The system is referred to as an "environment" and the primary company is referred to as an Environment Service Provider (ESP), while the system architect is referred to as the "customer." The primary company obtains revenue for providing the resources and the tools to easily select, allocate, configure and run the environment.

Note that the preferred embodiment allows such fast allocation and configuration of resources that environments can be created from a pool of resources within minutes, or even seconds, (virtually) destroyed, and reallocated for creating different environments from the same pool of resources This allows "time sharing" of overall resources so that a first environment can be "alive" for a daily two-hour slot, followed by second, third and fourth environments being instantly created for the next four hours for three different customers, and so on. This also provides an efficient system for provisioning "crash-and-burn" systems which can be used in different software development lifecycle scenarios including testing, rapid beta deployment, etc. This also provides a cost-effective way for comparative evaluation of technologies.

A preferred embodiment allows customers to create a computing environment from a remotely accessible user interface such as a web page on the Internet. Thus, the customer can create, modify and operate the environment from anywhere in the world. Since the resources, in turn, can be coupled over networks, including the Internet, this approach eliminates the cost of shipping hardware and software. Designers, programmers, testers or other personnel using an environment can, similarly, be located anywhere in the world so that labor costs can be optimized.

The configuration of environments is automatic. For example, a customer can request a web-site simulator using 12 web-page servers on a Microsoft® NT platform, 2 disk arrays at a specific bandwidth and storage capacity, 2 caching servers and 200 clients running Netscape Navigator™ under Microsoft Windows® 2000 using Pentium III™ processors at under 800 MHz. Such an environment is created automatically and made accessible to the architect in real-time over the web. A further understanding of embodiments of the present invention will be gained with reference to the diagrams and descriptions which follow.

System Overview

FIG. 1 is a block diagram of system 100 for allocating processing resources according to the present invention. In FIG. 1, system 100 comprises, among other components customer/architect 101, a web-based interface 102, a computer network such as the Internet 108, configuration/access server system 103, the inventory of resources 105, the infrastructure server 104 for the maintenance of the inventory, and different levels of security 106 and 107. In a first embodiment, customer 101 uses the web-based interface 102 and the Internet 108 to interact with server system 103 for the purpose of allocating resources, as described below. The server 103 on receiving the information from the customer 101 allocates resources based on the customer's requirements and the availability of resources in the inventory 105. The access level security layer 106 ensures that customer 101 can access the server without any other customer being aware of the information passed between the interface 102 and the server 103. The isolation level security layer 107 ensures that the resources being used by the customer 101 are available "in isolation" i.e., no other customer or outsider knows about the configuration or the specifics of the computing environment used by customer 101.

Although not shown, one of ordinary skill in the art will realize that the "inventory" may include various machine and device types. For example, such devices may include mobile/laptop computers, embedded computing devices, hand-held computers, personal digital assistants, point-of-sale terminals and smart-card devices without limitation It is possible to use widely varying components, or resources, than those shown in FIG. 1 to adequately implement the invention. The specific hardware and interconnections of FIG. 1 are but one example of an architecture for providing allocable resources. Although not shown, system 100 need not include Internet 108. In an exemplary embodiment, system 100 comprises a collection of one or more wired or wireless networks, which are not connected to the Internet. In a first embodiment, the present invention permits "virtual" hosting of computing environments. As used herein, the term "virtual" specifies that neither the requisite devices nor the network is physically accessible to users. Further, in accordance with this embodiment, the hosting process may be initiated or terminated by users at will.

Figure 2:
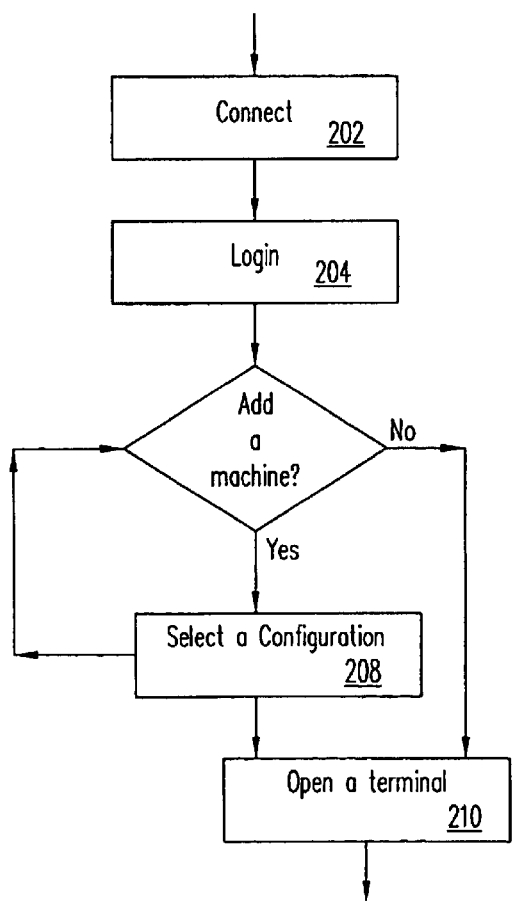
FIG. 2 is a flow chart for describing the basic steps performed by a server system to allocate resources in response to user interaction according to the present invention.

FIG. 2 shows a flowchart of the process by which customer 101 allocates resources in a preferred embodiment of the present invention.

In FIG. 2, the flowchart is entered at step 202, when the user desires to allocate resources.

At step 204, the user selects a "login option". It is assumed that a valid account has previously been opened for the USER1, under an account named ACCOUNT1, for example. Next, the user provides the user's information, namely, USER1, ACCOUNT1, and a password. Configuration server 103 locates the user named USER1 under ACCOUNT1 and authenticates the user identification, account and password.

Next, if USER1 has previously configured a laboratory for ACCOUNT1, it is retrieved. Otherwise, USER1 is presented with a "laboratory configuration" page. An example of the "laboratory configuration" page is shown in the screen shots furnished below.

At step 208, the computing resources are alloy. On clicking "select a configuration" on the menu option, USER1 creates a computing resource such as an x86 machine running Linux operating system. The configuration server 103 selects the required resources from the inventory 105 and instructs the infrastructure server 104 to configure this machine. At decision box 206, USER1 may configure or add as many machines, and operating systems and software as desired. If for example, USER1 wishes to configure a server for the computing environment, USER1 clicks on "select a configuration" again.

At step 210, USER1 may open a window on one of the machines which were previously configured by selecting "open a terminal" menu item. In response, the access server 103 provides USER1 with access to the specific machine.

USER INTERFACE

In operation, customer 101 wishing to allocate resources or create a computing environment connects to a web site served up by server system 103 and provided by Design2Deploy, Inc. Server 103 serves up a number of user interfaces to configure the desired resources, as illustrated with reference to the following screen shots. In a first embodiment, the user interfaces include text-based-forms or other data-entry fields, which prompts customer 101 to fill in the forms to obtain the desired information. The user interface also includes a visual configuration page showing the available options, which can be selected and added to the customer's environment.

Figure 3:
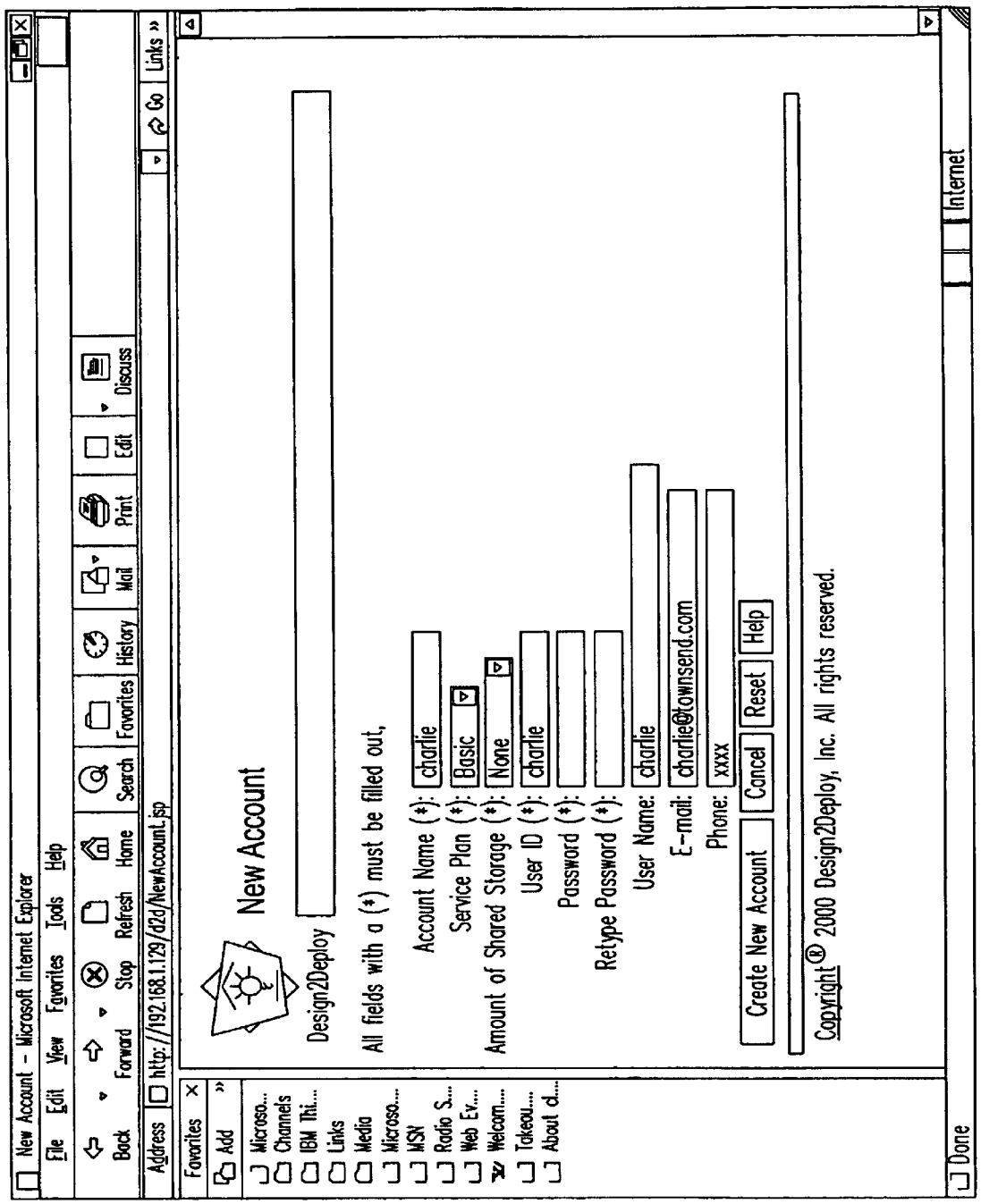
FIG. 3 is an example of a web page according to the present invention.

FIG. 3 is a screen shot for a web page 1 which illustrates the contents of a user interface served up on request by customer 101, the first time the customer visits the site provided by Design2Deploy, Inc.

As shown, the form in Web page 1 permits customer 103 to create a new account. Client 142 must also specify billing information when creating a new account. Such information can be an account number or a credit card number, for example.

Figure 4:
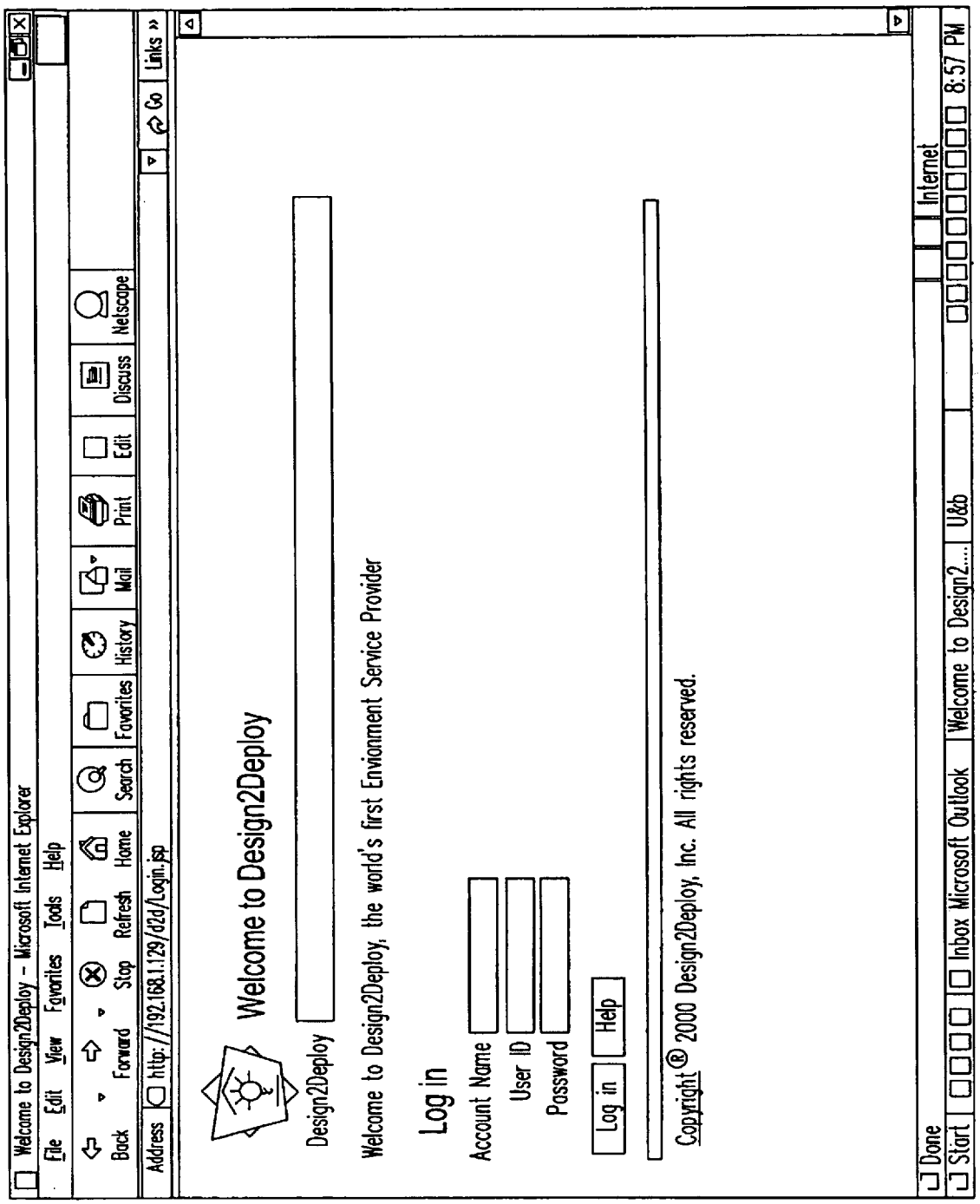
FIG. 4 is an example of a web page according to the present invention.

Once an account has been established and the credits verified, one can log into the account. In one embodiment, a multitude of users can be created within the same account, and all of these users could log into the account. FIG. 4 depicts a screen shot for a web page 2, which illustrates the form to be filled for log in by a user.

Figure 5:
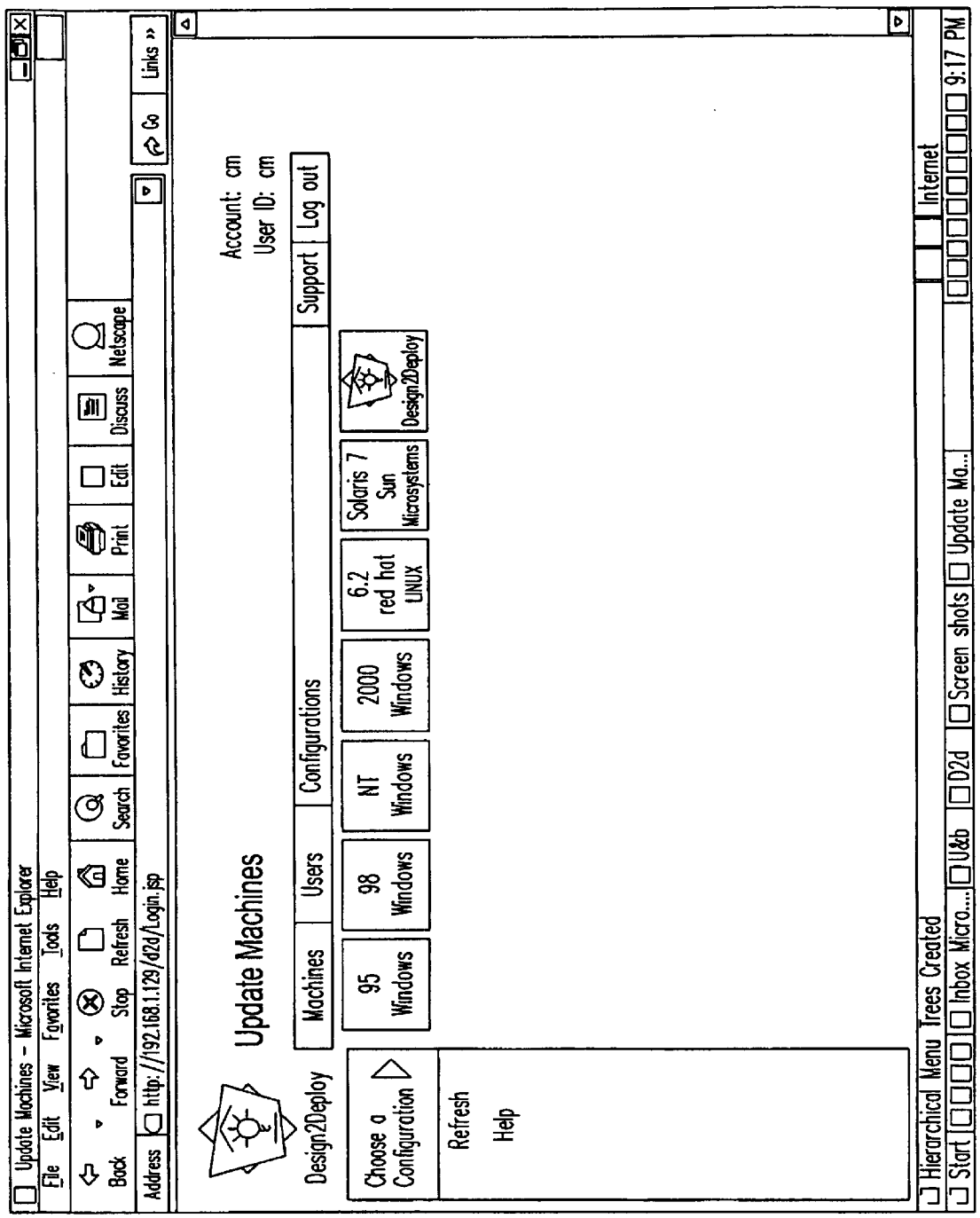
FIG. 5 is an example of a web page according to the present invention.

Once a user logs in, a configuration page is displayed —as illustrated in a web page 3 of FIG. 5.

Figure 6:
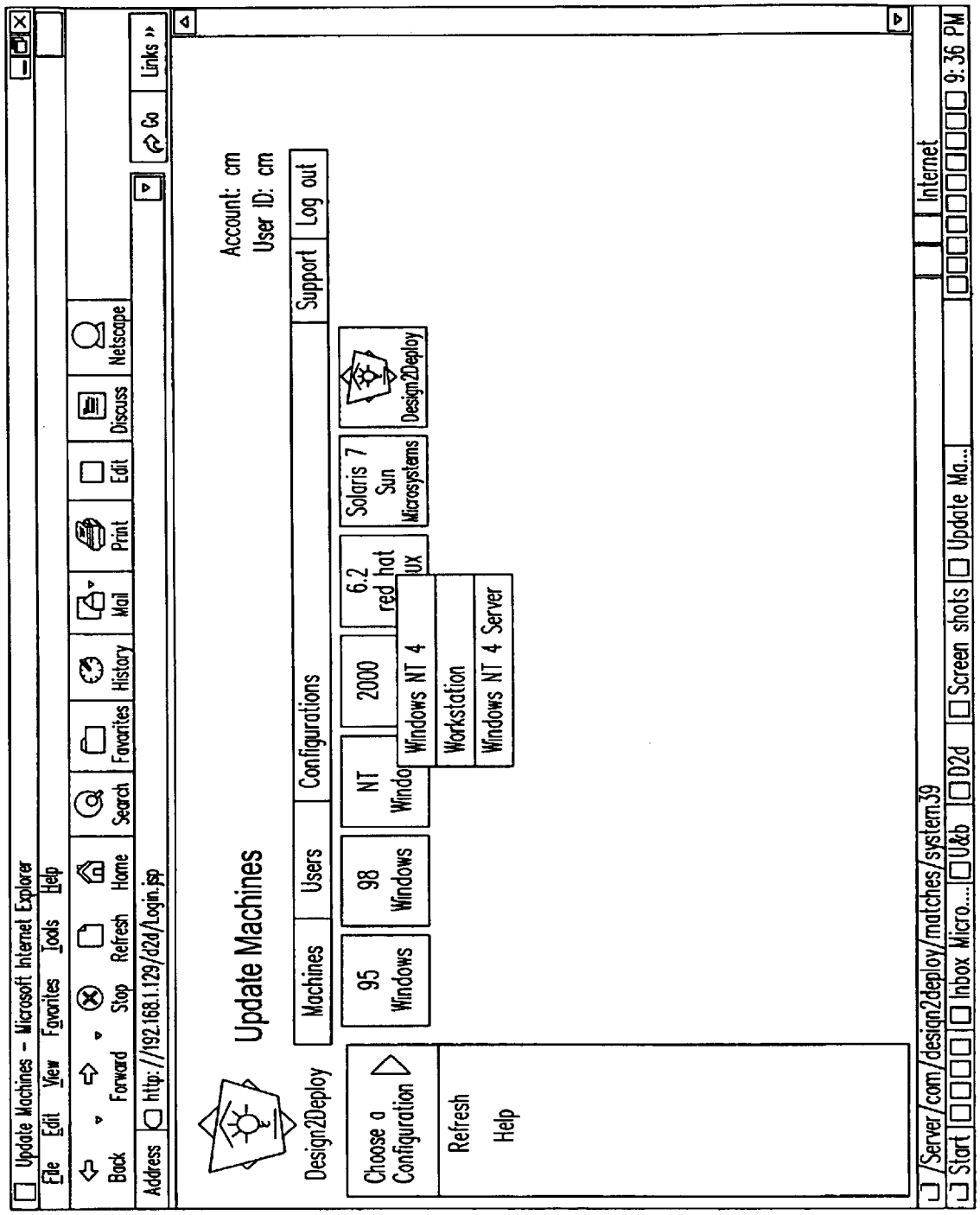
FIG. 6 is an example of a web page according to the present invention.

Web page 3 displays a list—by default—of configurations available. The user can select one of these options by selecting the menu items as shown in the screen shot for web page 4 of FIG. 6. If the user is revisiting an environment that has already been configured, then the environment will also be displayed (not shown).

Based on the selection made by the user, the configuration server 103 allocates a computer with the requested operating system and other application software. In another embodiment the user will be allowed to specify constraints on the hardware such as the size of the hard disk. In a further embodiment, the configurations listed will include computing devices like hand-held devices, cell-phones, point-of-sale terminals and others.

Figure 7:
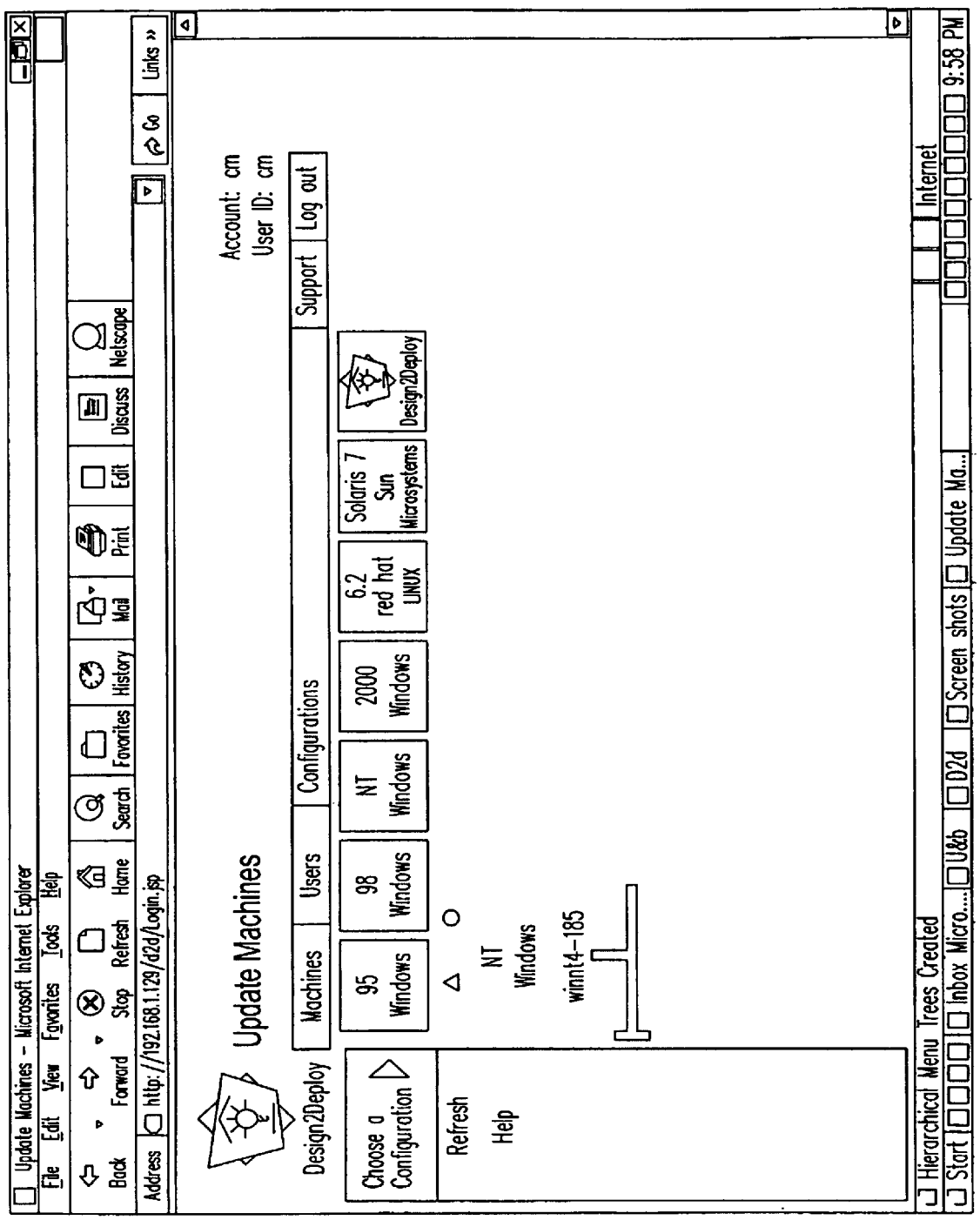
FIG. 7 is an example of a web page according to the present invention.

Once the allocation is done by the server 103, the user interface 102, gets updated as illustrated in the screen shot for web page 5 of FIG. 7.

Figure 8:
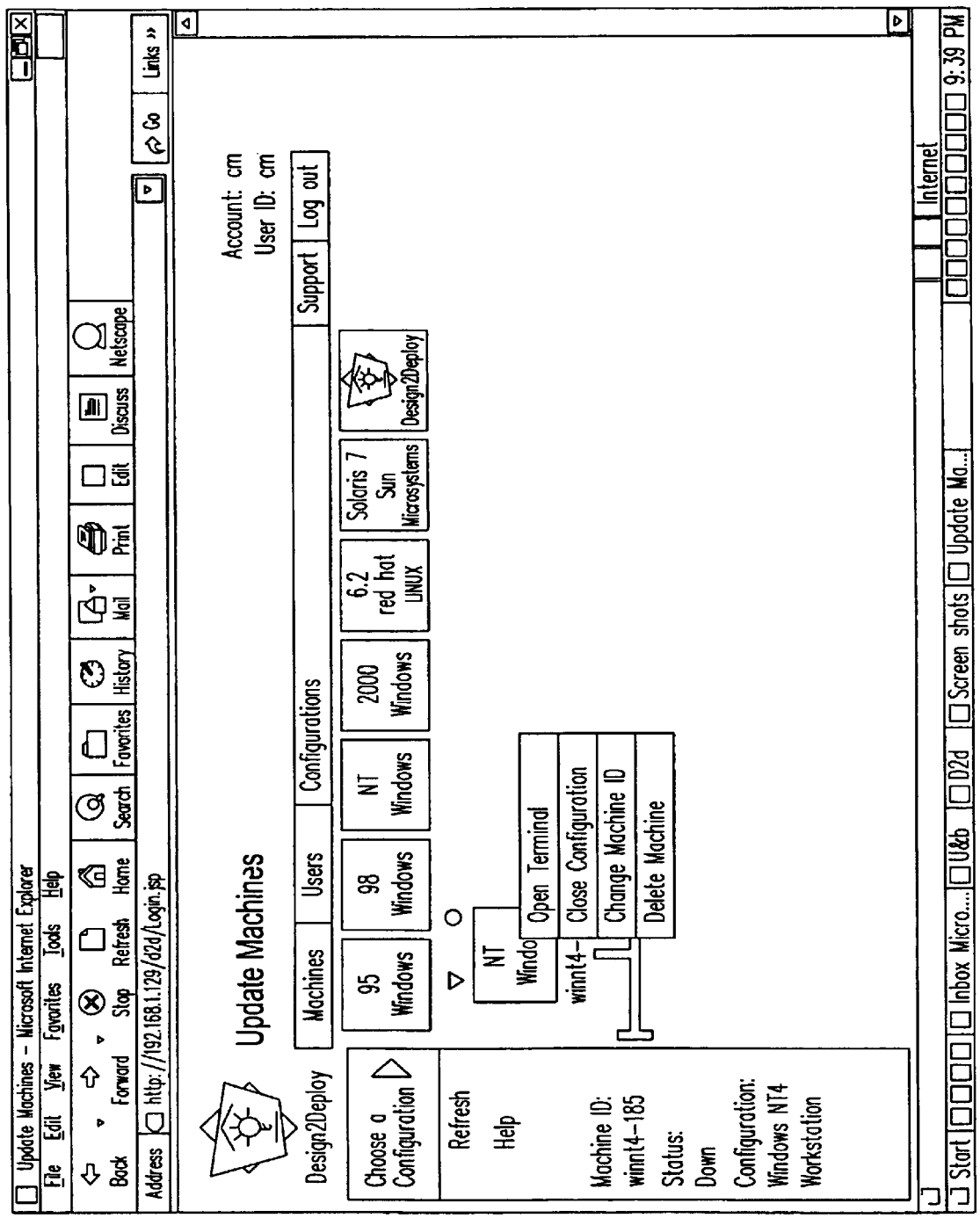
FIG. 8 is an example of a web page according to the present invention.

Once allocated, the user can open a terminal to access the specific computing device. In one embodiment the icon representing the device—like the one named winnt4-185 in web page 5—indicates whether the device is active or not. The triangle pointing downward and located above the icon identified as winnt4-185 in web page 5 denotes that the device winnt4-185 is not active. The user can now select to open a terminal to access this device as shown in web page 6, as depicted in FIG. 8.

Figure 9:
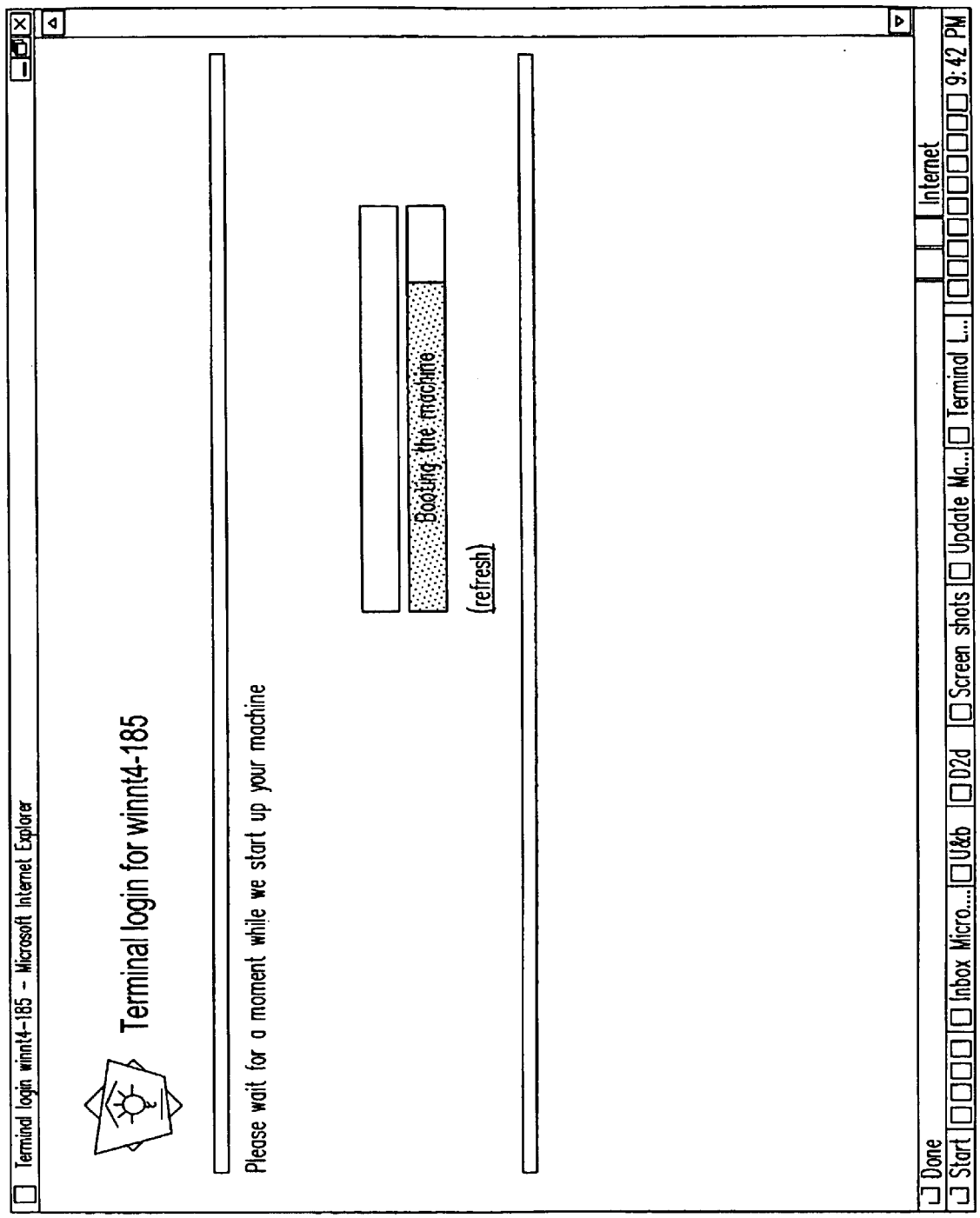
FIG. 9 is an example of a web page according to the present invention.

When the user tries to access (by selecting open terminal as in web page 6), the configuration/access server 103 activates the machine from the inventory 105 by using the infrastructure server 104. Then a pop-window is displayed as shown in web page 6-a showing the status of the activation step, as depicted in FIG. 9.

Figure 10:
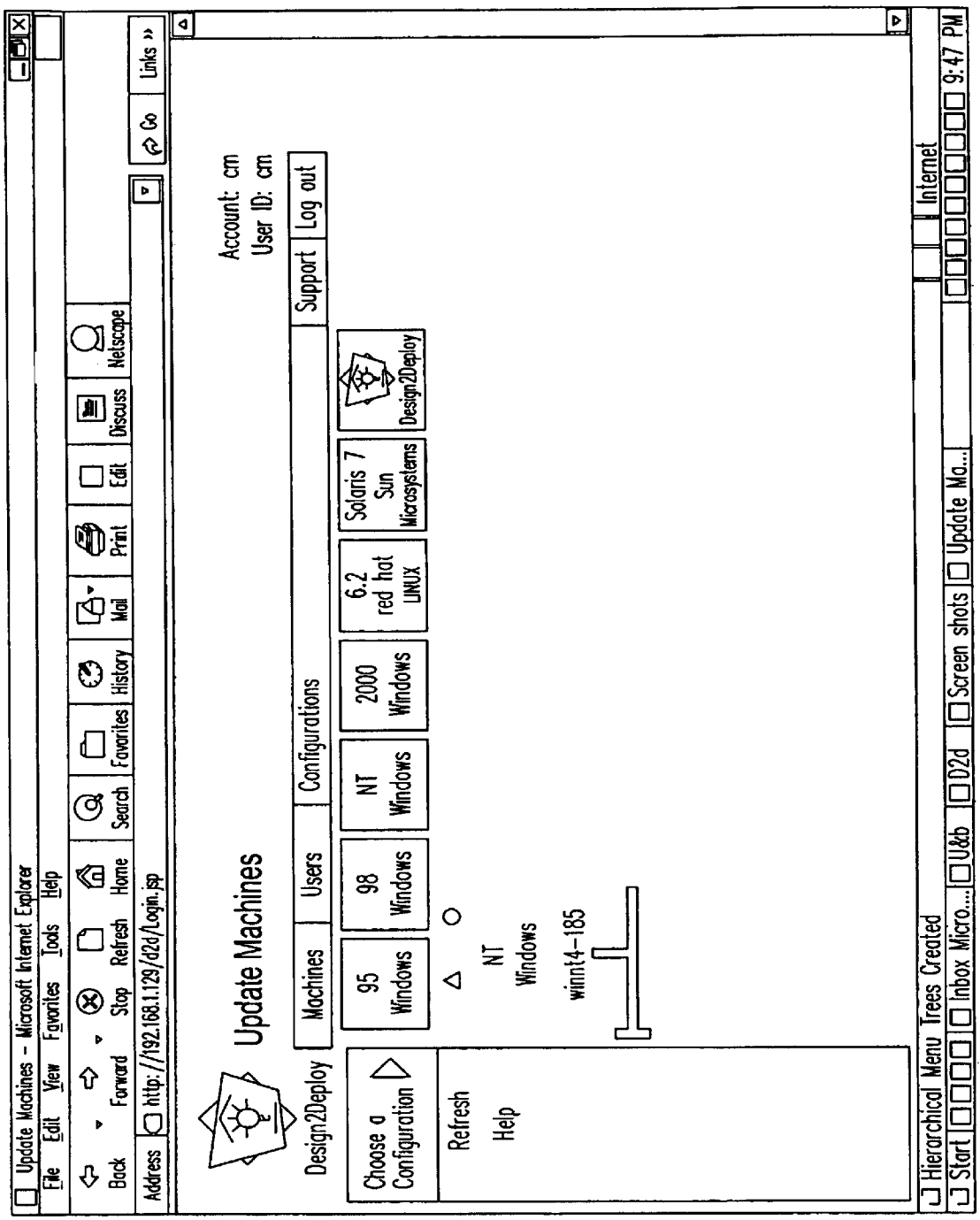
FIG. 10 is an example of a web page according to the present invention.

Once the computing device has been completely activated, the status of the device is updated on the user interface 102 as shown in web page 7, as depicted in FIG. 10.

Figure 11:
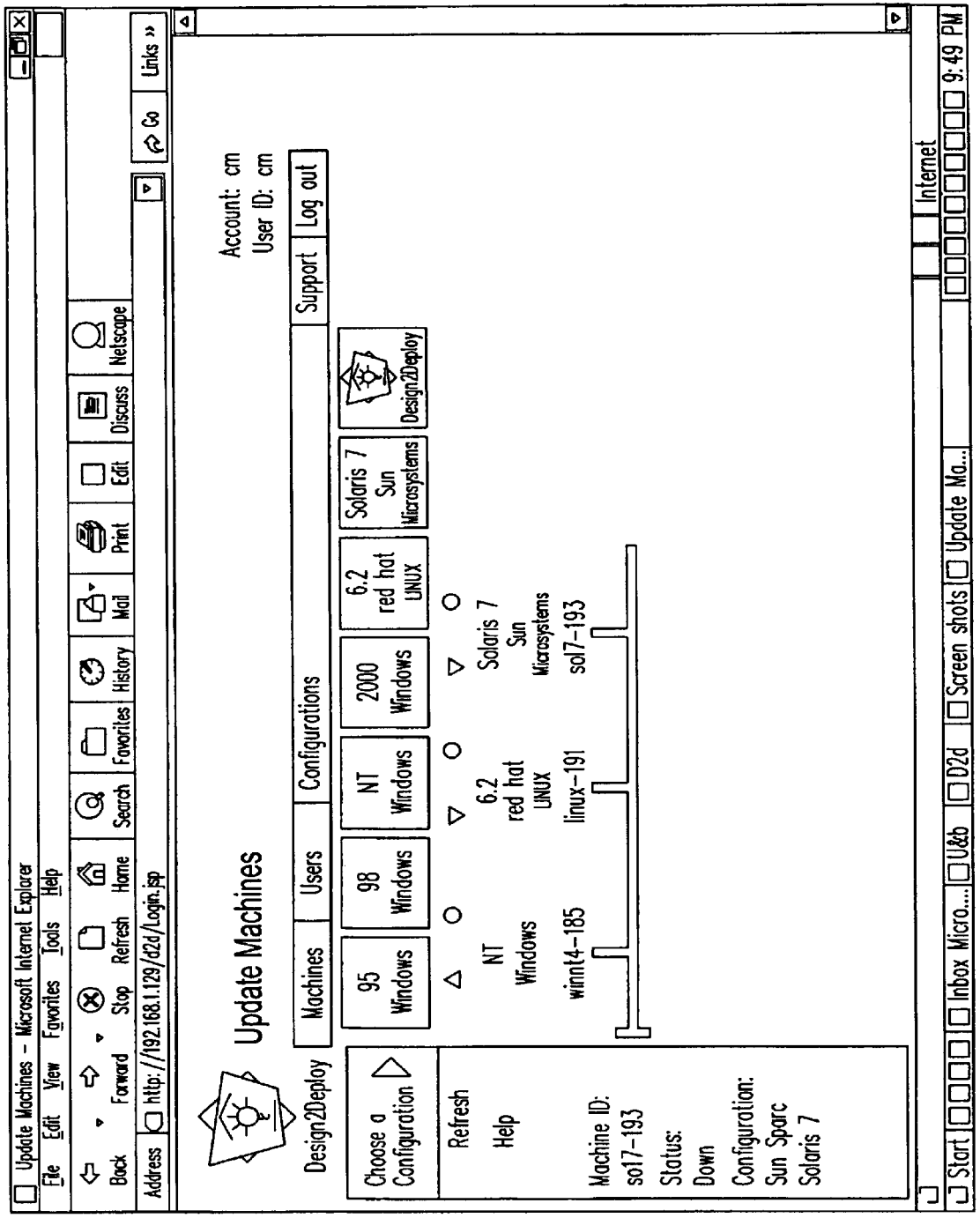
FIG. 11 is an example of a web page according to the present invention.

It must be observed that the only difference between web page 6 and web page 7 is that the status of the device winnt4-185 has been changed from inactive (triangle pointing downward) to active (triangle pointing upward). In addition, a window displaying the screen of the requested device will also pop-up as soon as the device is activated. (This window is not shown here). Once the user has access to this device through this pop-up window, the device is under the user's complete control. The user can further repeat the previous steps in allocating a device as explained in step 206 of FIG. 2. For example, after additional steps for requests of allocations, the user interface 102 may display web page 8, as depicted in FIG. 11.

When a user logs out the environment will be saved automatically. When the user revisits the account, the environment is displayed along with a list of configurations.

Herein ties a first advantage of the present invention. The steps illustrated above allow a user to instantaneously create a configurable, secure, and distributed computing environment. Also the present invention insures that the process outlined above can be repeated simultaneously by multitude of independent customers.

Although the present invention has been discussed with respect to specific embodiments, one of ordinary skill in the art will realize that these embodiments are merely illustrative, and not restrictive, of the invention. The scope of the invention is to be determined solely by the appended claims.

What is claimed is:

1. A system for providing configurable resources to create a computing environment, the system comprising
    a configurable communication link;
    a plurality of hardware devices coupled to the communication link;
    a plurality of software programs executable by the hardware devices, the software programs comprising at least one of operating system software and application software, wherein the computing environment comprises the communication link, at least one of the hardware devices and at least one of the software programs; and
    a visual construction of the computing environment via a user interface, the user interface coupled to a display screen and to an input device for generating signals in response to interactions of a user, wherein
        the user interface is configured to accept a signal which enables the user to request a copy a device configuration,
        the system is configured to make the copy of the device configuration and save the copy of the device configuration in storage,
        the user interface is further configured to accept a signal which enables the user to instantiate a device from a stored configuration, and
        the system is further configured to instantiate the device from the stored configuration.

2. The system of claim 1, wherein the user interface configured to
    accept a first signal from the input device which enables the user to specify a type of operating system for use in the computing environment;
    accept a second signal from the input device which enables the user to specify a type of hardware for use within the computing environment;
    accept one or more further signals from the input device which enable the user to specify software to be used within the computing environment.

3. The system of claim 2, wherein the user interface is further configured to:
    accept a signal which allows the user to specify a new device to run in the computing environment,
    activate the new device, and
    display the computing environment having the new device.

4. The system of claim 3, wherein the user interface is further configured to display a plurality of configurations-before accepting a first signal which enables the user to specify a type of configuration.

5. The system of claim 4, wherein the hardware devices comprise at least one of a hand-held device, a PDA, a cell phone, a smart card, a Global Positioning System device, and a Point-of-Sale terminal.

6. The system of claim 4, wherein the user interface is further configured to:
    accept a signal which allows the user to specify constraints on the hardware.

7. The system of claim 6, wherein
    the user interface is further configured to accept a signal which enables the user to specify a request for shared storage; and
    the system is further configured to allocate the shared storage to be accessible through at least one of the hardware devices.

8. The system of claim 6, wherein
    the user interface is further configured to accept a signal which enables the user to specify a request for private storage; and
    the system is further configured to allocate the private storage to be accessible through specific devices in the computing environment for a specific user.

9. A system for providing configurable resources to create a computing environment, the system comprising
    a configurable communication link;
    a plurality of hardware devices coupled to the communication link;
    a plurality of software programs executable by the hardware devices, the software programs comprising at least one of operating system software and application software, wherein the computing environment comprises the communication link, at least one of the hardware devices and at least one of the software programs;
    a visual construction of the computing environment via a user interface, the user interface coupled to a display screen and to an input device for generating signals in response to interactions of a user, wherein the user interface configured to:

accept a first signal from the input device which enables the user to specify a type of operating system for use in the computing environment;

accept a second signal from the input device which enables the user to specify a type of hardware for use within the computing environment;

accept one or more further signals from the input device which enable the user to specify software to be used within the computing environment, wherein the user interface is further configured to accept a signal which allows the user to specify a new device to run in the computing environment, activate the new device, display the computing environment having the new device, display a plurality of configurations-before accepting a first signal which enables the user to specify a type of configuration, accept a signal which allows the user to specify constraints on the hardware, accept a signal which enables the user to specify a request for private storage, accept a signal which enables the user to request a copy of a device configuration, and accept a signal which enables the user to instantiate a device from a stored configuration, and the system is further configured to allocate the private storage to be accessible through specific devices in the computing environment for a specific user, make the copy of the device configuration and save the copy of the device configuration in storage, and instantiate the device from the stored configuration.

* * * * *

UNITED STATES PATENT AND TRADEMARK OFFICE
CERTIFICATE OF CORRECTION

| | | |
|---|---|---|
| PATENT NO. | : 7,065,637 B1 | Page 1 of 1 |
| APPLICATION NO. | : 09/662990 | |
| DATED | : September 15, 2000 | |
| INVENTOR(S) | : Nanja | |

It is certified that error appears in the above-identified patent and that said Letters Patent is hereby corrected as shown below:

Title page, under Item (73) Assignee: please delete "VERITAS Operating Corporating"; and INSERT -- VERITAS Operating Corporation --.

Title page, under Item (57) ABSTRACT, line 8 of abstract, after "system architect to design" delete "for".

Signed and Sealed this

Seventh Day of December, 2010

David J. Kappos
*Director of the United States Patent and Trademark Office*